United States Patent
Bhatti et al.

(10) Patent No.: US 8,200,837 B1
(45) Date of Patent: Jun. 12, 2012

(54) METHOD AND SYSTEM FOR MAINTAINING A CONTENT SERVER AT SAFE LOAD CONDITIONS

(75) Inventors: Nina T. Bhatti, Mountain View, CA (US); Tarek Farouk Abdelzaher, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/299,684

(22) Filed: Apr. 26, 1999

(51) Int. Cl.
*G06F 15/16* (2006.01)

(52) U.S. Cl. .................. 709/232; 709/219; 709/247

(58) Field of Classification Search .................. 709/226, 709/228, 231, 232, 234, 236, 246; 705/14; 707/101, 102
See application file for complete search history.

(56) References Cited

U.S. PATENT DOCUMENTS

| | | | | |
|---|---|---|---|---|
| 5,764,235 A * | 6/1998 | Hunt et al. | | |
| 5,802,299 A * | 9/1998 | Logan et al. | | |
| 5,852,673 A * | 12/1998 | Young | | |
| 5,917,822 A * | 6/1999 | Lyles et al. | | |
| 5,918,013 A * | 6/1999 | Mighdoll et al. | ............. | 709/228 |
| 5,995,943 A * | 11/1999 | Bull et al. | ....................... | 705/14 |
| 6,021,426 A * | 2/2000 | Douglis et al. | | |
| 6,028,842 A * | 2/2000 | Chapman et al. | | |
| 6,038,598 A * | 3/2000 | Danneels | ...................... | 709/219 |
| 6,041,041 A * | 3/2000 | Ramanathan et al. | ........ | 370/241 |
| 6,052,718 A * | 4/2000 | Gifford | ......................... | 709/219 |
| 6,061,700 A * | 5/2000 | Brobst et al. | | |
| 6,067,557 A * | 5/2000 | Hegde | | |
| 6,105,042 A * | 8/2000 | Aganovic et al. | ............. | 715/500 |
| 6,128,668 A * | 10/2000 | Barber et al. | ................. | 709/246 |
| 6,148,005 A * | 11/2000 | Paul et al. | | |
| 6,157,614 A * | 12/2000 | Pasternak et al. | | |
| 6,161,137 A * | 12/2000 | Ogdon et al. | ................. | 709/224 |
| 6,167,085 A * | 12/2000 | Saunders et al. | | |
| 6,182,125 B1 * | 1/2001 | Borella et al. | ................ | 709/226 |
| 6,185,221 B1 * | 2/2001 | Aybay | | |
| 6,185,625 B1 * | 2/2001 | Tso et al. | | |
| 6,216,157 B1 * | 4/2001 | Vishwanath et al. | | |
| 6,243,761 B1 * | 6/2001 | Mogul et al. | .................. | 709/246 |
| 6,263,114 B1 * | 7/2001 | Saunders | | |
| 6,269,078 B1 * | 7/2001 | Lakshman et al. | | |
| 6,314,463 B1 * | 11/2001 | Abbott et al. | ................. | 709/224 |

(Continued)

OTHER PUBLICATIONS

Engelschall, Ralf S. "Apache HTTP Server Version 1.3: Module mod_rewrite". Archived on Jan. 11, 1998 by the Internet Archive: <http://web.archive.org/web/19980111100041/www.apache.org/docs/mod/mod_rewrite.html>. pp. 1 to 18.*

(Continued)

*Primary Examiner* — Christopher Biagini

(57) ABSTRACT

A data service system in a data access network system is described. The data service system includes a content server that stores content files for access by external access requests. Each of the content files is stored in a full content format and an adapted or degraded content format which is less resource-intensive to serve than the full content format. The data service system also includes an adaptive load control system which is coupled to the content server to pass the access requests to the content server. The adaptive load control system modifies an access request to access the corresponding content file in the adapted content format when the content server is in an overload condition such that the content server can be maintained at safe load conditions. A method of maintaining the content server at safe load conditions is also described.

6 Claims, 7 Drawing Sheets

U.S. PATENT DOCUMENTS

| | | | | |
|---|---|---|---|---|
| 6,317,795 | B1 * | 11/2001 | Malkin et al. | 709/246 |
| 6,378,053 | B1 * | 4/2002 | Lamaire et al. | |
| 6,389,462 | B1 * | 5/2002 | Cohen et al. | 709/218 |
| 6,441,831 | B1 * | 8/2002 | Abramowitz et al. | 345/716 |
| 6,449,647 | B1 * | 9/2002 | Colby et al. | 709/226 |
| 6,484,212 | B1 * | 11/2002 | Markowitz et al. | 709/246 |
| 6,490,627 | B1 * | 12/2002 | Kalra et al. | 709/231 |
| 6,499,051 | B1 * | 12/2002 | Kanemitsu | |
| 6,505,256 | B1 * | 1/2003 | York | 709/246 |
| 6,535,922 | B1 * | 3/2003 | Kikinis | 709/228 |
| 6,553,410 | B2 * | 4/2003 | Kikinis | |
| 6,564,250 | B1 * | 5/2003 | Nguyen | 709/208 |
| 6,581,109 | B1 * | 6/2003 | Fields et al. | 709/246 |
| 6,587,109 | B1 * | 7/2003 | Rose et al. | |
| 6,594,699 | B1 * | 7/2003 | Sahai et al. | 709/232 |
| 2001/0049833 | A1 * | 12/2001 | Greenland et al. | |
| 2002/0049833 | A1 * | 4/2002 | Kikinis | 709/246 |
| 2002/0069296 | A1 * | 6/2002 | Aua et al. | 709/246 |

OTHER PUBLICATIONS

Multimedia-Friendly Server and Comminication Design, K.Shin, et al, XP-002157973, Apr. 1999-Jun. 1999.

Agile Application-Aware Adaption for Mobility, B.D.Noble,et al, XP-00771038, Dec. 1997.

* cited by examiner

METHOD AND SYSTEM FOR MAINTAINING A CONTENT SERVER AT SAFE LOAD CONDITIONS

FIELD OF THE INVENTION

The present invention pertains to Internet/Intranet systems. More particularly, this invention relates to an adaptive web server that serves user access requests for the web server to less resource intensive contents in the web server when the web server is overloaded.

DESCRIPTION OF THE RELATED ART

An example of a data access network system is the Internet or Intranet network system. An Internet/Intranet network system typically includes a number of data service systems connected together via interconnect networks. The data service systems typically include web and/or content servers that host contents for various customers or applications. The customers are the owners of the contents hosted in the data service systems such that subscribers or users can access the contents via their computer terminals. The content servers typically utilize Internet applications, such as electronic mail, bulletin boards, news groups, and World Wide Web access. The hosted contents are arranged in the form of content sites within the content servers. Each site may include a number of pages (e.g., world wide web pages). A content site is typically for one customer of the server while a particular customer may own a number of content sites. The content servers may also be referred to as web servers.

Often, a web page is formed from a number of data and/or executable program files, such as text files, graphics files, audio files, video files, and application program files. Each of the files is referred to as an "object". The web pages can be accessed by a user at a user terminal (e.g., a personal computer system or a web access device) connected to any one of the data service systems.

As is known, access to the web pages via Internet is typically structured around the HTTP (Hyper Text Transfer Protocol) protocol. The HTTP protocol is a request-and-response protocol. When a user at a client device designates a particular web page, at least one request is generated. The number of requests is dependent upon the sophistication of the designated web page. As described above, a web page may include one or more "objects". A multi-object page is aesthetically pleasing, but each object requires a separate request and a separate response. Therefore, the time for each request-and-response round trip plays a role in determining the total time a user must wait to view the complete web page.

A web server can be accessed by multiple users at the same time. The web server typically handles the user access requests in the first-come-first-served (FIFO) fashion. One disadvantage of this type of prior art web server structure is that the web server is not equipped with protection mechanism against excessive load conditions. As is known, a web server typically has limits on the number of requests it can handle per second. In addition, the web server also has limits on the response time and bandwidth that can be served. Under high loads, the web server can be overwhelmed with requests, resulting in longer response time and poor performance for users. Thus, when the number of user access requests to the web server greatly exceeds the processing capacity of the web server (i.e., overloaded), the web server either handles a request in an unbearably long period of time or simply becomes non responsive. The sharp increase in server response time may also cause user connections to time out, creating the perception that the server is down or crashed. In mission-critical applications, such as e-commerce, perceived server downtime may result in loss of sales and/or other financial losses.

SUMMARY OF THE INVENTION

One feature of the present invention is to improve performance of a web server.

Another feature of the present invention is to increase performance of a web server by serving user access requests for the web server from less resource intensive contents in the web server when the web server is to be overloaded.

A further feature of the present invention is to provide an adaptive web server that, when in overload situation, routes the user access requests to the less resource intensive contents in the web server such that the web server does not become overloaded or non-functional.

A data service system in a data access network system includes a content server that stores content files for access by external access requests. Each of the content files is stored in a full content format and any number of adapted or degraded content formats which are less resource-intensive to serve than the full content format. The data service system also includes an adaptive load control system which is coupled to the content server to pass the access requests to the content server. The adaptive load control system modifies an access request to access the corresponding content file in one of the adapted content formats when the content server is in an overload condition such that the content server can be maintained at safe load conditions.

In a data service system of a data access network system having a content server that stores content files for access by external access requests, a method of maintaining the content server at safe load conditions includes the step of determining load condition of the content server when the data service system receives an access request to access one of the content files stored in the content server. This step can be performed internally in the content server or external to the content server. If the content server is determined to be in an overload condition, then the access request is modified to access the corresponding content file in an adapted content format which is less resource-intensive to serve than the same file in a full content format such that the content server is maintained at the safe load conditions.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
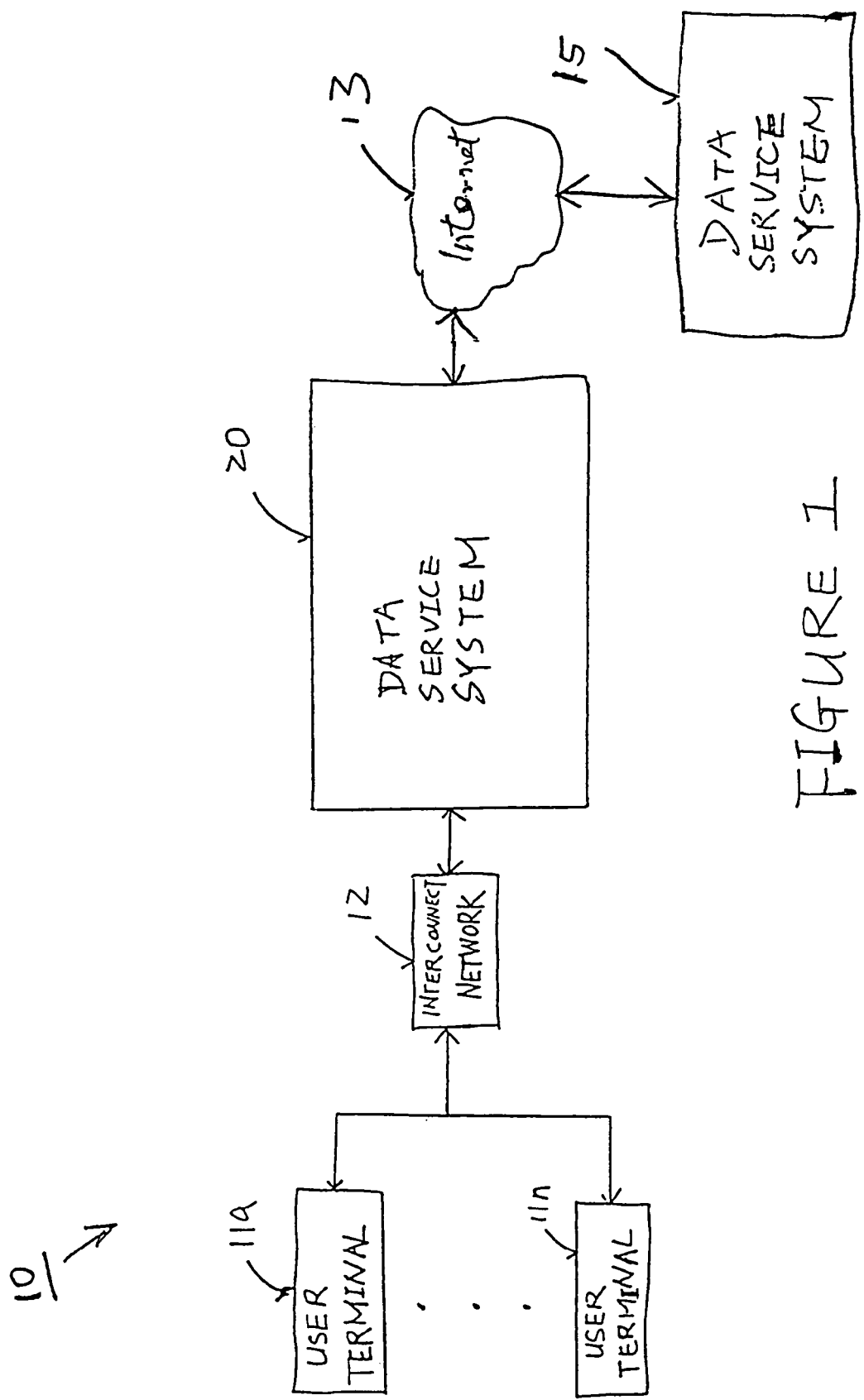
FIG. 1 shows a data access network system that includes a number of data service systems.

FIG. 1 shows a data access network system 10. In one embodiment, the network system 10 is an Internet system. In another embodiment, the network system 10 is an Intranet system. Alternatively, the data access network system 10 may be any other known network system that employs a known communication protocol.

As can be seen from FIG. 1, the data service system 20 is connected to a number of user terminals 11a through 11n via an interconnect network 12. Users at each of the user terminals 11a-11n can access the data service system 20 for the services provided by the data service system 20. The users at each of the user terminals 11a-11n can also access the data service system 15 for the services provided by the data service system 15 via the data service system 20 and the Internet 13. The user terminals 11a-11n can also be referred to as client devices.

Each of the user terminals 11a-11n may be located at a residence, a school, or an office of the user. Each of the user terminals 11a-11n includes a network access application program (e.g., a web browser application program such as Netscape's Navigator) that allows the user to access the data services offered by the data service systems 15 and 20.

Each of the user terminals 11a-11n can be a computer system or other electronic device with data processing capabilities (e.g., a web TV). The interconnect network 12 can be any known network, such as Ethernet, ISDN (Integrated Services Digital Network), T-1 or T-3 link, FDDI (Fiber Distributed Data Network), cable or wireless LMDS network or telephone line network.

FIG. 1 shows only two data service systems 15 and 20 for the data access network system 10 for illustration purposes only. In practice, the data access network system 10 may include many more data service systems. In addition, the Internet 13 is formed by a number of data service systems connected together via a network. Data communications among all data service systems are conducted using a predetermined communication protocol for Internet/Intranet communications. In one embodiment, the communication protocol is the Hyper Text Transport Protocol (HTTP). Alternatively, other known communication protocols for Internet/Intranet communications can also be used.

Each of the data service systems 15 and 20 has substantially the same functional structure, which will be described in more detail below. Each of the data service systems 15 and 20 can be employed by an Internet/Intranet Service Provider (ISP) to offer data services (e.g., web, news, or advertisement) and other services (e.g., e-commerce, e-mail) to users or subscribers connected to the data access system 10 via one of the data service systems 15 and 20.

Each of the data service systems 15 and 20 includes a number of servers (e.g., web servers, e-mail servers, news servers, e-commerce servers, domain name servers, address assignment servers, proxy servers, advertisement servers, and session manager servers). The web servers, e-mail servers, news servers, e-commerce servers, and advertisement servers can be collectively referred to as local service servers or content servers. A content server typically stores a number of content files that include Hyper-Text Markup Language (HTML) web pages, gif images, video clips, etc. Data transfers to and from the content servers are enabled by transport protocols such as Transport Control Protocol (TCP) and the User Datagram Protocol (UDP). The content servers support a variety of Internet applications to provide services such as access to the World Wide Web, electronic mail, bulletin boards, chat rooms, news groups, and e-commerce. Using a currently commercially available web browser and other client applications, users via their respective user terminals can access the content files (e.g., web pages, news, images, e-mails,) stored in the content servers.

As described above, the access to the content servers is structured around the HTTP protocol which is a request-and-response protocol. When a user at a user terminal desires to access a content file stored in a content server of one of the data service systems 15 and 20, at least one request is generated and sent to the content server. The content server can handle multiple requests at the same time. However, the content server has limits on the number of requests it can handle per second. When the number of requests received by the content server greatly exceeds the limits of the content server, the content server will be in an overload condition, resulting in at least unbearably longer response time and poor performance for users. This means when the request rate increases beyond the server capacity, server performance deteriorates dramatically, potentially causing a service outage. In addition, when a client issues a request and does not get any response, the client is likely to issue several more subsequent requests. This quickly increases the number of requests received by the content server. To resolve the problem, each of the data service systems 15 and 20, in accordance with one embodiment of the present invention, includes an adaptive load control mechanism to control the load condition of its content servers such that each content server does not become overloaded. Alternatively, the load control mechanism of the present invention can also be applied to other servers of each of the data service systems 15 and 20. The adaptive load control mechanism is described in more detail below, also in conjunction with FIGS. 2-6.

Figure 2:
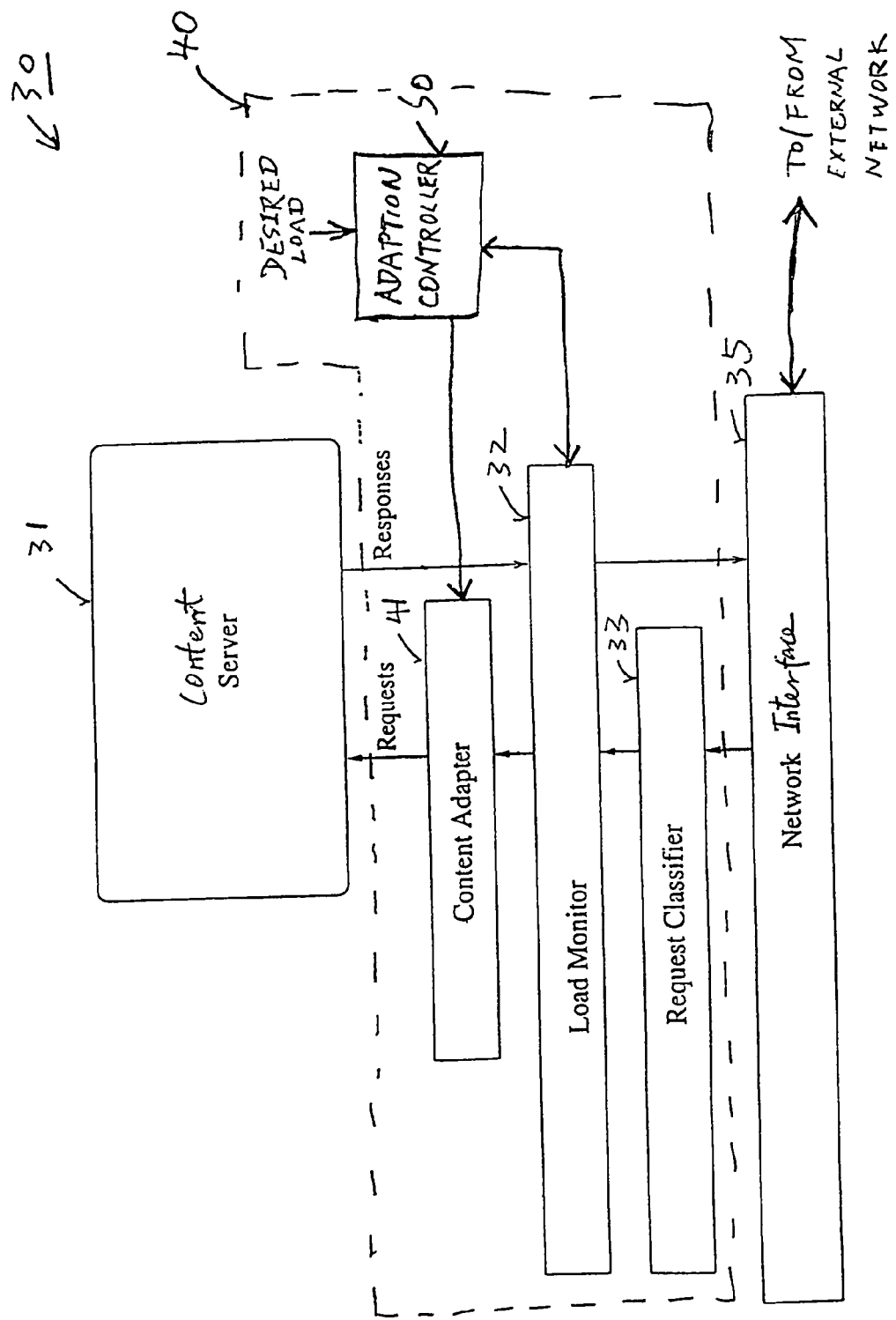
FIG. 2 shows the structure of one of the adaptive data service systems of FIG. 1 in accordance with one embodiment of the present invention.

As can be seen from FIG. 2, a data service system 30 in accordance with one embodiment of the present invention is shown to include a content server 31. The data service system 30 also includes an adaptive load control system 40 that controls the load condition of the content server 31 in accordance with one embodiment of the present invention. Thus, the data service system 30 can also be referred to as adaptive data service system or adaptive web server. The data service system 30 can be any one of the data service systems (e.g., the data service system 15 or 20) of FIG. 1.

As will be described in more detail below, the content server 31 stores content files or dynamic executable code/program for access by access requests. Thus, the content files hereinafter refer to (1) static content files, (2) dynamic content files, and (3) executable programs/codes. Each of the content files is stored in a full content format and an adapted or degraded content format. A content file in the adapted content format is much smaller in size and less resource intensive than the same file in the full content format. The adaptive load control system 40 passes the access requests to the content server 31 when receiving the requests. When the content server 31 is in an overload condition or about to be in the overload condition, the adaptive load control system 40 modifies the access requests to access their corresponding content files in the adapted content format. When the adaptive load control system 40 determines that the content server 31 is not in the overload condition, the adaptive load control system 40 modifies the access requests to access their corresponding content files in the full content format. This allows the content server 31 to be maintained at safe load conditions. Alternatively, the adaptive load control system 40 can adapt the content server 31 based not on the load condition of the content server 31, but on the client's abilities (e.g., network connection of the client device, latency, or display capability of the client device). The data service system 30 will be described in more detail below, also in connection with FIGS. 2-6.

The data service system 30 can be implemented in a computer system or other data processing system. The computer system that implements the data service system 30 can be server computer system, a workstation computer system, a personal computer system, or a mainframe computer system, a notebook computer system, or any other computer system.

The data service system 30 includes a network interface 35 that interfaces the adaptive load control system 40. The adaptive load control system 40 then interfaces with the content server 31. The network interface 35 serves as the interface of the data service system 30 with external network (not shown). The interface 35 can be implemented by any known network interface technology, and thus will not be described in more detail below. The network interface 35 receives external requests for the content server 31 and passes the requests to the content server 31 via the adaptive load control system 40.

The content server 31 can be any kind of content server that stores a number of content files. Each of the content files can be accessed by an access request. The content server 31 may also include a number of content sites, each storing a number of content files for access by multiple access requests. The multiple content sites may belong to different content providers or customers with potential conflicting interests. In this case, the adaptive load control system 40 causes the content server 31 to be a number of performance-isolated virtual content servers, which will be described in more detail below. Each of the servers has a capability to provide independent performance guarantees regardless of the load on the other virtual servers.

The content server 31 can be a static server or dynamic server. In one embodiment, the content server 31 is a static content server that stores static content files only. In another embodiment, the content server 31 may store both static and dynamic content files. As is known, web content is generally classified as static, such as a file, or dynamic, such as cgi-scripts. Dynamic content may be generated at run-time by a back-end engine (e.g., a database engine) that is separate from the server itself. Any adaption at the back-end engine is not handled by the adaptive load control system 40.

Figure 4:
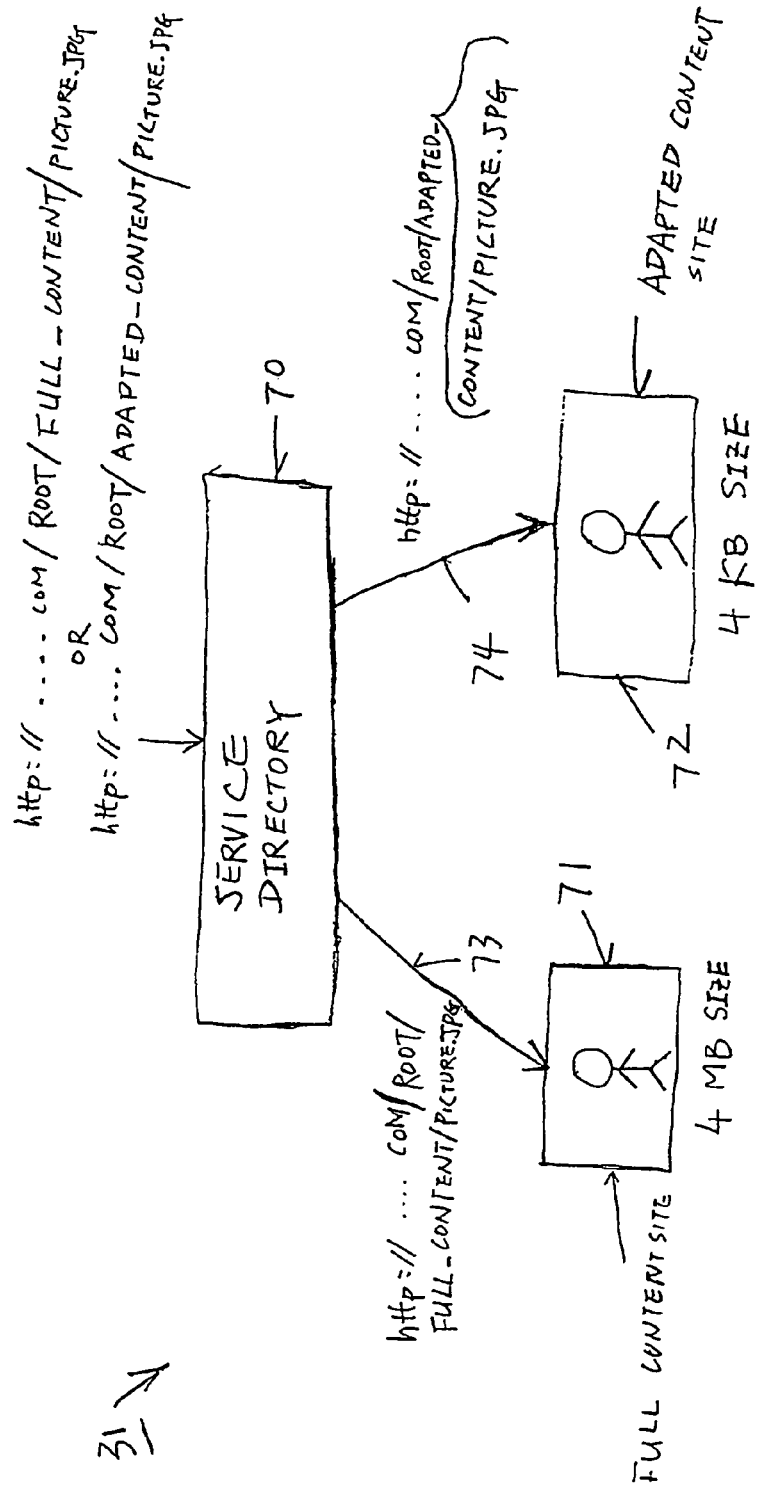
FIG. 4 schematically shows the structure of the content server of the adaptive data service system of FIG. 2.

In accordance with one embodiment of the present invention, each of the content files stored in the content server 31 is stored in multiple formats or versions. For example, a content file can be stored in its original full content format or version. The same content file is also stored in a degraded or adapted format or version in the content server 31. FIG. 4 shows an example of such arrangement. As can be seen from FIG. 4, the content file in the degraded format 72 is smaller in size and worse in viewing quality than the same file in the full content format or version 71. This means that the degraded format of the content file requires less resource (e.g., bandwidth) to serve than the counterpart full content format of the same content file. This is possible because a content file can be shown, for example, at 64×64 pixel resolution, at 128×128 pixel resolution, at 256×256 pixel resolution, or at higher or lower resolutions. The 256×256 pixel resolution version of a content file clearly has more image data and requires more resource to transfer than the 128×128 pixel resolution version of the same content file. Thus, if the full content version of a content file is at the 256×256 pixel resolution, the degraded version of the same content file can be at 128×128 pixel resolution, or at 64×64 pixel resolution. In summary, the degraded format of a content file may include images of less resolution, fewer embedded images, simplified or simpler pages without backgrounds or fewer hyper-links than the full content format of the same content file. Alternatively, each of the content files stored in the content server 31 has several degraded versions of the same content file. The content server 31 will be described in more detail below with only two versions (i.e., the full content version and one degraded version), for example, for each of the content files stored in the content server 31 for illustration purposes only.

Referring again to FIG. 2, each access request specifies a content file stored in the content server 31 using the Universal Resource Locator (URL) which is an address. The URL path for a content file stored in the content server 31, however, does not specify which version or format from which the content file will be accessed. This means that multiple content trees contain different versions of the same URL. The path to a particular URL in a given content tree will be the concatenation of the content tree name and the URL name, prefixed by the name of the root service directory of the content server 31. For example, two content trees may be created in the root service directory "/root", one being "/full_content" and the other "/degraded_content". The "/full_content" content tree name directs the request to access the corresponding content file in the full content version or format. The "/degraded_content" content tree name directs the request to access the corresponding content file in the degraded content version or format. In this case, a URL of "http://www.hpl.hp.com/my_picture.jpg" may be served from either the directory "/root/full_content/my_picture.jpg", or from the directory "root/degraded_content/my_picture.jpg".

The scheme applies even if the content file is dynamic content, such as the content generated by cgi-scripts. Multiple content trees may contain different versions or formats of the named cgi-scripts (e.g., "my_script.cgi"). The "/degraded_content/" version or format is a less resource-intensive search script that, for example, looks only for the first five matches, instead of the "/full_content" version or format that looks for one hundred matches. The URL of the script is then prefixed by the right tree name to determine which version of the script to execute under given load conditions. For example, the URL of "http://www.hpl.hp.com/my_script.cgi" may be modified to become either "http://www.hpl.hp.com/rootall_content/cgi-bin/my_script.cgi" or "http://www.hpl.hp.com/root/degraded_content/cgi-bi/my_script.cgi".

Alternatively, the less resource-intensive "/degraded_content" search script can be replaced or substituted with a static version or format. This can be done by switching to a different content tree. For example, an on-line vendor using the content server 31 can use a dynamically generated version of their product catalog that interacts with a stock database to display the items currently in stock. When the content server 31 is overloaded, its statically pre-stored catalog version is then accessed and displayed. The reason for doing this is that a dynamic script, even degraded or simplified, still consumes more resources to serve than the static content.

The adaptive load control system 40 is connected to the content server 31. In accordance with one embodiment of the present invention, the adaptive load control system 40 detects overload condition of the content server 31 and causes the access requests to access the corresponding file from one of several alternative content qualities for delivery in accordance with the load conditions. When the adaptive load control system 40 detects that the content server 31 is in the overload conditions, the adaptive load control system 40 causes the incoming access requests to the content server 31 to access the corresponding content files in the degraded format which is less resource-intensive to serve. The degraded format reduces the size of responses. The degraded format also reduces the total number of requests as the simplified content includes fewer embedded images and/or other objects. The degraded format also removes or reduces links embedded in the requested content file. Thus, the degraded format is less resource intensive to serve than the full content format.

The adaptive load control system 40 is also able to reject access requests if needed. In addition, the adaptive load control system 40 supports co-existence of multiple performance-isolated virtual servers such that performance levels and load adaption decisions of virtual server do not affect that of another virtual server. This is required when the content server 31 hosts multiple content sites that possibly belong to different customers or content providers with potentially conflicting interests. The total load on the server 31 may not be evenly distributed among the hosted sites. In this case, the adaptive load control system 40 implements a performance isolation mechanism that does not penalize a site for excessive load incurred by another site. Using this mechanism, the content server 31 is viewed as a collection of one or more performance-isolated virtual servers, each with a capability to provide independent performance guarantees regardless of the load on other virtual servers, if any. Guarantees are declared in a service level agreement associated with each virtual server and are used to configure the adaptive load control system 40 for appropriate resource capacity allocation. The load adaptive control system 40 makes adaption decisions within each virtual server of the content server 31 on its load and resource allocation.

Moreover, the adaptive load control system 40 also gives preferential treatment to guaranteed service classes, while allowing non-guaranteed service classes to consume the excess capability when available. The guaranteed service classes are governed by service level agreements. The non-guaranteed classes are typically served on best effort basis with available resources. Under overload conditions, the adaptive load control system 40 should direct non-=guaranteed requests to their degraded content files first. An arbitrary policy can govern the relative degradation of client classes with different importance levels. For example, under overload conditions, the class A requests should be sent to the degraded content files before class B requests. But if resources remain scarce, class B requests are then degraded before rejecting class A requests.

The adaptive load control system 40 can be implemented at any point in the data service system 30 where the server's requests and responses can be accessed. This means that the adaptive load control system 40 can be implemented in the web server software, in the UNIX socket library, or in the operating system of a computer system that embodies the data service system 30. Moreover, the adaptive load control system 40 can also be implemented in the gateway that is external to the server, as well as transparent to the server.

Basically, the adaptive load control system 40 requires three entry points. They are (1) initialization point, (2) request pre-processing point, and (3) request post-processing point. The initialization point initializes internally used data structures, and creates a separate process that implements various components of the adaptive load control system 40 if desired. The request pre-processing point decides the quality of content level of the given request. The content adaptor 41 of the adaptive load control system 40 is called from this point. The content adaptor 41 may communicate with the other components via shared memory. The request post-processing point is an optional point which monitors response size.

If server code is not available, the adaptive load control system 40 can be implemented in a middleware (e.g., a dynamically linked socket library) used by the server 31. In a UNIX environment, as part of server initialization, the server socket is created and a listen( ) call is made to the socket library to listen for incoming requests. This library routine can be modified to call the initialization point of the middleware. The modification can be transparent to the content server 31. The functional structure of the adaptive load control system 40 is described in more detail below, also in conjunction with FIGS. 2-7.

As can be seen from FIG. 2, the adaptive load control system 40 includes a request classifier 33 connected to the network interface 35. The adaptive load control system 40 also includes a load monitor 32 connected to the request classifier 33. A content adapter 41 is then connected to the load monitor 32 and the content server 31. An adaption controller 50 is connected to the content adapter 41 and the load monitor 32. The components 32-33, 41, and 50 together form the adaptive load control system 40. Alternatively, the adaptive load control system 40 may include more or fewer components than above mentioned. For example, the adaptive load control system 40 may function without the request classifier 33.

The request classifier 33 receives the access requests from the network interface 35. The request classifier 33 is used to classify the received access requests into a number of classes based on different classification metrics. The request classifier 33 allows preferential treatment to a subset of content sites or clients. The request classifier 33 is used in an installation where quality of service differentiation is required among different classes of clients (e.g., guaranteed and non-guaranteed clients, or clients accessing different virtual servers). In this situation, the action taken by the content adapter 41 later may depend on the identity of the client or the requested content. The request classifier 33 allows multiple classes of users to share the same content file or site and yet receive different treatments or performance. Class-based service is a mechanism for differentiating services given to individual classes. Thus, service performance can be priced based on performance or service agreements. A higher class with greater guarantee can be priced higher than a lower class that may offer less guarantee and more "best effort" services. The request classifier 33 can be implemented using any known technology.

The request classifier 33 then sends the classified access requests to the load monitor 32. The load monitor 32 is used to monitor the load condition of the content server 31 in order to detect overload condition. The load monitor 32 employs a number of monitoring mechanisms to monitor the load condition of the content server 31. One way of monitoring the load condition of the content server 31 is to monitor the response time of the content server 31. This is because response time is proportional to the length of the input request queue of the content server 31 (e.g., the server's socket listen queue in a UNIX implementation). When the server is underloaded, the queue tends to be short (or empty), resulting in short response time. When the content server 31 is overloaded, the request queue within the content server 31 overflows, making the response time grow an order of magnitude. This serves as a clear overload indicator. The advantage of this approach (i.e., estimating queue length by monitoring response time) is that the mechanism can be implemented outside the server process and requires no modification to the code of the content server 31.

Another way of monitoring whether the content server 31 is overloaded is to monitor utilization of the server machine, as well as the response time. This allows the load monitor 32 to determine how under-utilized the server is. When utilization decreases below a predetermined level, load monitor 32 may determine the content server 31 is no longer in the overload condition.

In this case, in order to provide a faithful server load estimate, utilization measurement should be indicative of the load attributed to useful work (i.e., serving client requests), rather than the aggregated utilization. For example, the existence of a low priority process or thread that implements a busy-waiting loop on some event will render the utilization identically 100% even in the absence of load on the server. Another concern arises when all server threads or processes have been committed to current requests and are blocked in I/O. The resulting idle time cannot be taken advantage of since all resources are already utilized and therefore should not be measured towards available capacity.

To account for the above mentioned concerns, two different mechanisms are developed for the load monitor 32. The first is referred to as the Linear Approximation Method. Using this method, the load monitor 32 employs a linear function of measured request rate R and delivered bandwidth BW to determine the system utilization U, consumed by processing client requests.

The linear function is shown as follows.

$$U = aR + bPW$$

wherein constants a and b can be computed by either on-line or off-line priori profiling as will be described below. The function is good for estimating offered load as long as it does not exceed server capacity. When measuring in the overload condition, the linear approximation method is invalid. Thus, the linear approximation method is combined with the response time monitoring to determine the actual load condition of the server 31. This combined load monitoring function means that if the measured response time is above the predetermined overload threshold, U=100%. If the measured response time is below the predetermined overload threshold, U=aR+bBW.

One advantage of this linear approximation method is that it is easy to implement. Using this method, each server process or thread Tj records independently its observed request rate Rj, delivered bandwidth BWj, and utilization Uj. A separate monitor process or thread then reads and sums up the recorded values to compute the aggregate request rate R, bandwidth BW, and utilization U. Synchronization of access to shared data structures is not required since there is only one writer to any piece of data. The method allows server capacity planning for quality of service guarantees, and it provides means for converting the desired request rate and bandwidth guarantee into a corresponding resource capacity allocation (i.e., allocated utilization). This method, however, requires computing the constants a and b using the priori profiling.

A simple way of computing the constants a and b using the priori profiling is to obtain several measurements of U and the corresponding R and BW. Then a linear regression technique is employed to determine the constants a and b that best fit the equation U=aR+bBW. Note that R and BW can be measured online by counting requests seen and bytes delivered within a given period. Utilization U can be measured using a Gap Estimation method which will be described later. Given the measured values of R, BW, and U, at successive time intervals, estimation theory provides a way to find a linear fit that minimizes the error. It provides the necessary formulae for computing and updating the parameters a and b online in view of successive new measurements.

Alternatively, the parameters a and b can be determined by testing the content server 31 with a pre-specified workload. Testing can proceed by requesting a URL of a given size at an increasing rate until client connections start timing out, indicating server overload. The maximum attained request rate and bandwidth are then recorded. For our purposes, server utilization can be assumed to be 100% at this load condition. The experiment is repeated for different sizes of the requested URL, giving a different rate and bandwidth combination that saturates the server 31. The set of R, BW, and U=100% points are used to construct the line aR+bBW=100 on an R, BW, plane. The line intersects the R and BW axes at 100/a and 100/b respectively, from which a and b are found.

The second mechanism for the load monitor 32 is referred to as the Gap Estimation Method. This method estimates the fraction of time that the content server 31 spends serving requests. Using this method, the load monitor 32 employs a global counter to track the requests. The load monitor 32 increments the counter when a request is received and decrements the counter when a response departs the content server 31. The counter will return to its initial value only when a gap is present (i.e., when all current requests have been served and no additional requests have arrived yet). By summing up the gaps over a period of time T, a monitor process or thread can compute the total "idle time" G within that time period T. The idle time is the time where no requests are pending. The utilization is then estimated as U=(T−G)/T.

Figure 7:
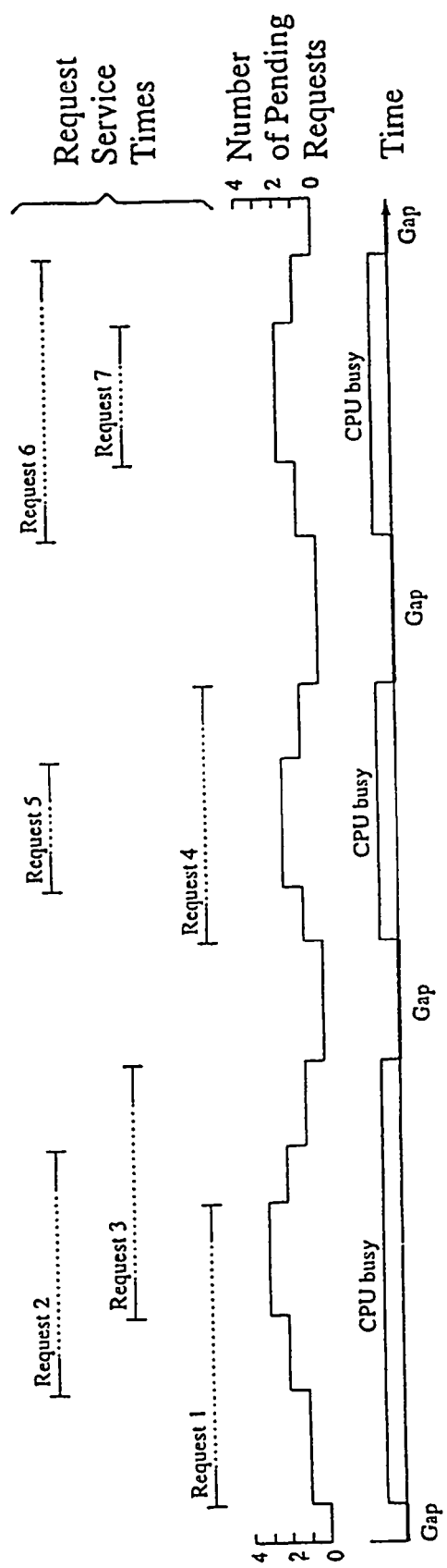
FIG. 7 shows a Gap Estimation method employed by a load monitor of FIGS. 2-3.

The Gap Estimation method is illustrated in FIG. 7. As can be seen from FIG. 7, concurrent processing of request bursts are separated with idle time. The method does not require a prior profiling, and does not require monitoring response time. The global counter may be updated by multiple writers and thus requires some form of locking or access synchronization.

Referring back to FIG. 2, the load monitor 32 sends the load condition information of the content server 31 to the content adapter 41 and the adaption controller 50. The adaption controller 50 also receives a predetermined desired load value which indicates the threshold of the overload condition. Based on the comparison of the desired load value and the monitored load value, the adaptive controller 50 determines whether the content server 31 is in the overload condition in which case the adaptive controller 50 causes the content adapter 41 to modify the URLs of all the incoming access requests to access their corresponding content files in the degraded content format or version. If the adaptive controller 50 determines that the content server 31 is not in the overload condition in which case the adaptive controller 50 causes the content adapter 41 to modify the URLs of the incoming access requests to access their corresponding content files in the full content format or version.

The desired load value for the adaption controller 50 can be a predetermined threshold T of the server response time. This threshold T can be set equal to (or slightly smaller than) the maximum server response time specified in the service level agreement, if any, thereby causing adaption when the agreement is about to be violated. In the absence of such specification, the threshold can be derived from the pre-configured maximum input request queue length Q and the average service time S. For example, if we consider a 90% full queue to be an overload indication, the threshold T can be set to T=0.9=Q×S.

The content adapter 41 effects adaption by changing directory links. Under the control of the adaptive controller 50, the content adapter 41 modifies the URLs of the incoming access requests to access the corresponding content files in either the full content format or one of the degraded content formats. For example, the content adapter 41 can modify the URL of "http://www.hpl.hp.com/my_picture.jpg" as either "http://www.hpl.hp.com/full_content/my_picture.jpg" to access the content file "my_picture.jpg" in the full content format, or "http://www.hpl.hp.com/degraded_content/my_picture.jpg" to access the content file "my_picture.jpg" in the degraded content format. As another example, when the content is a dynamic content (e.g., http://www.hpl.hp.com/my_script.cgi), the content adapter 41 can modify the URL as either "http://www.hpl.hp.com/full_content/cgi-bin/my_script.cgi" to access the full script file, or "http://www.hpl.hp.com/degraded_content/cgi-bin/my_script.cgi" to access the less resource-intensive script.

When the adaption controller 50 determines that the content server 31 is in the overload condition, the adaption controller 50 causes the content adapter 41 to modify the URLs of the incoming access requests to access the corresponding content files in the degraded or adapted content format. As described above, the degraded or adapted content format requires less resources to serve than the full content format. When the adaption controller 50 determines that the content server 31 is not in the overload condition, the adaption controller 50 causes the content adapter 41 to modify the URLs of the incoming access requests to access the corresponding content files in the full content format.

As can be seen from FIGS. 2 and 4, once the adaption trigger is fired from the adaption controller 50, the content adapter 41 switches transparently between the high quality service tree 73 (FIG. 4) and the degraded quality service tree 74 (FIG. 4) in the root service directory 70 (FIG. 4) based on the load condition of the content server 31. The switching operation is completely transparent to the content server 31.

Figure 5:
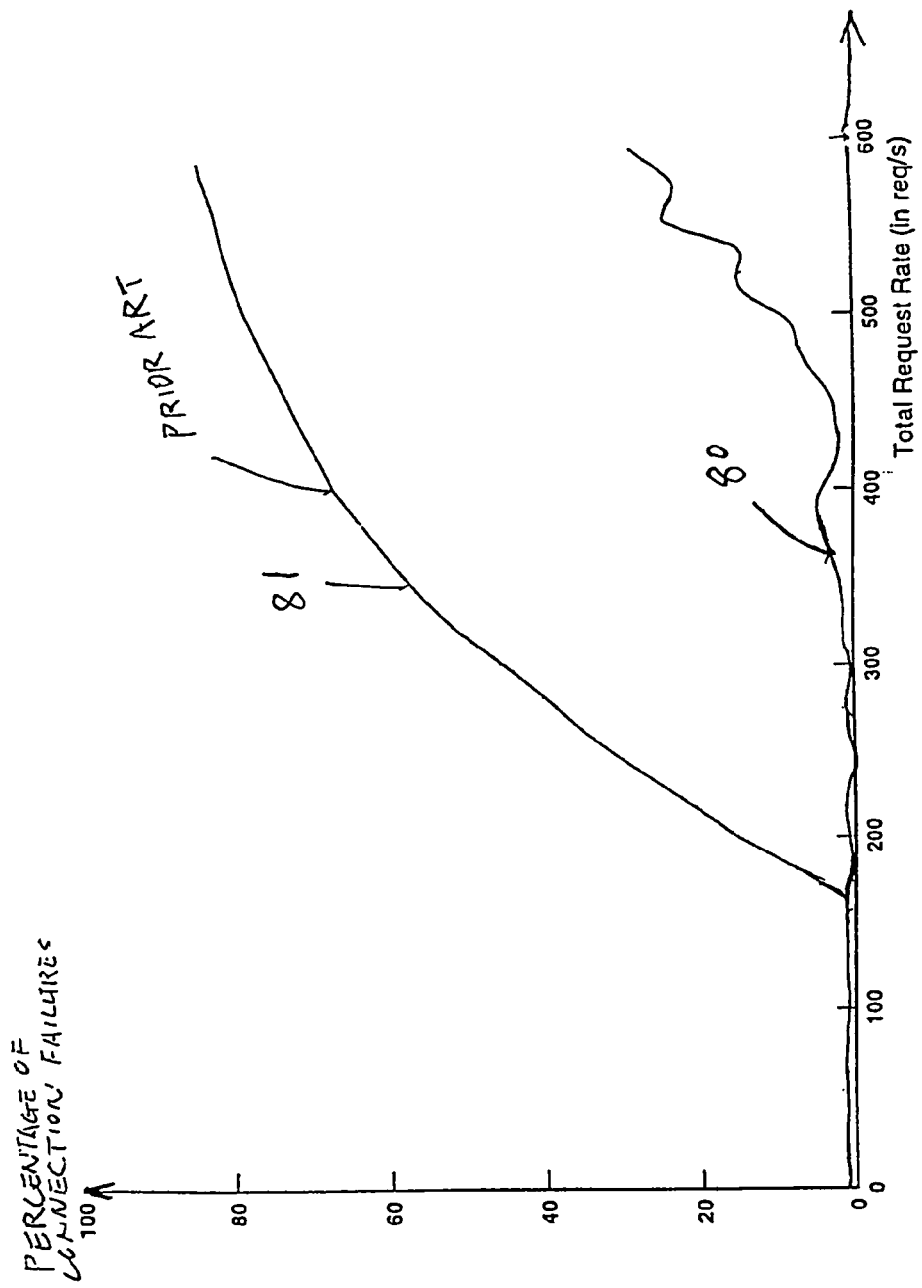
FIGS. 5 and 6 show various comparisons between the adaptive data service system of FIG. 2 and a prior art data service system.

FIG. 5 shows the result of the adaption process by the adaptive load control system 40. The curve 81 shows the percentage of connection failures by a prior art server without the adaptive load control system 40. The curve 80 shows the percentage of connection failures by the content server 31 with the adaptive load control system 40. As can be seen from FIG. 5, the curve 80 shows significantly fewer connection failures than the prior art curve 81 as the request rate increases. The traditional server suffers an increasing error rate (i.e., connection failures) when offered load exceeds capacity of the server.

Figure 6:
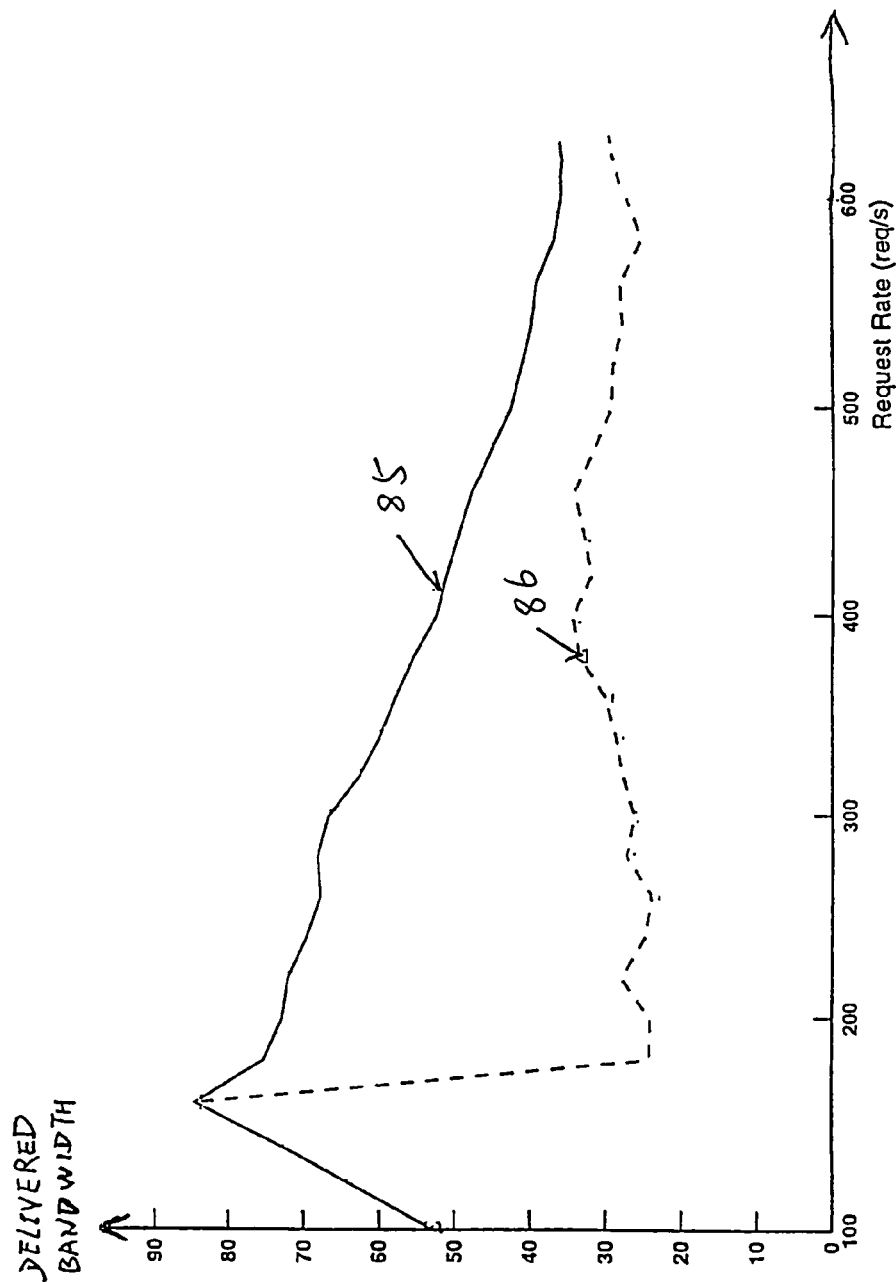

As described above, when the adaption controller 50 determines that the content server 31 is overloaded, the controller 50 causes the content adapter 41 to adapt all incoming access requests to the degraded content format. This potentially makes the content server 31 under-loaded, thus not achieving adequate resource utilization when the adaption takes place. This effect is shown in FIG. 6. In FIG. 6, the solid line curve 85 represents the delivered bandwidth of a prior art content server without the adaption mechanism in accordance with one embodiment of the present invention and the broken line curve 86 represents the delivered bandwidth of the content server 31 with the adaptive load control system 40. As can be seen from FIG. 6, a sharp drop in delivered bandwidth for the curve 86 is shown for the content server 31 when adaption takes place by switching to less resource-intensive content format. This leaves server bandwidth underutilized.

This can be overcome by only causing the content adapter 41 to degrade a fraction of the incoming access requests when the content server 31 is in the overload condition. The fraction can be between nothing and the all of the incoming access requests. This mechanism is implemented in the content adapter 41. It uses an input control parameter G which can be thought of as an external control knob that tunes the extent of partial degradation. The extremes are G=Max, where no request is degraded, and G=0, where all incoming requests are degraded. Thus, decreasing G will decrease server load.

Assuming the total number of available content trees are Max and the content trees are numbered from 1 to Max in increasing order of quality (tree 0 is a special tree that stands for request rejection). Let I be the integral part of G and let F be the fractional part. The following rule is used:
If G is an integer (i.e., G=I, F=0), the content adapter 41 lets every request be served from the tree I.
If G is not an integer, the content adapter 41 computes a pseudo-random number N (in the range [0,1]) upon the receipt of each request. If N<F, the request is served from tree I+1. Otherwise it is served from tree I.

This algorithm provides a continuous partial degradation spectrum that ranges between serving all requests from the highest quality content tree and rejecting all requests. Next, a self-regulating technique will be described, in conjunction with FIG. 3, that uses monitoring and feedback to automatically select the best value of G such that the overload is prevented and a specified target utilization is maintained.

Figure 3:
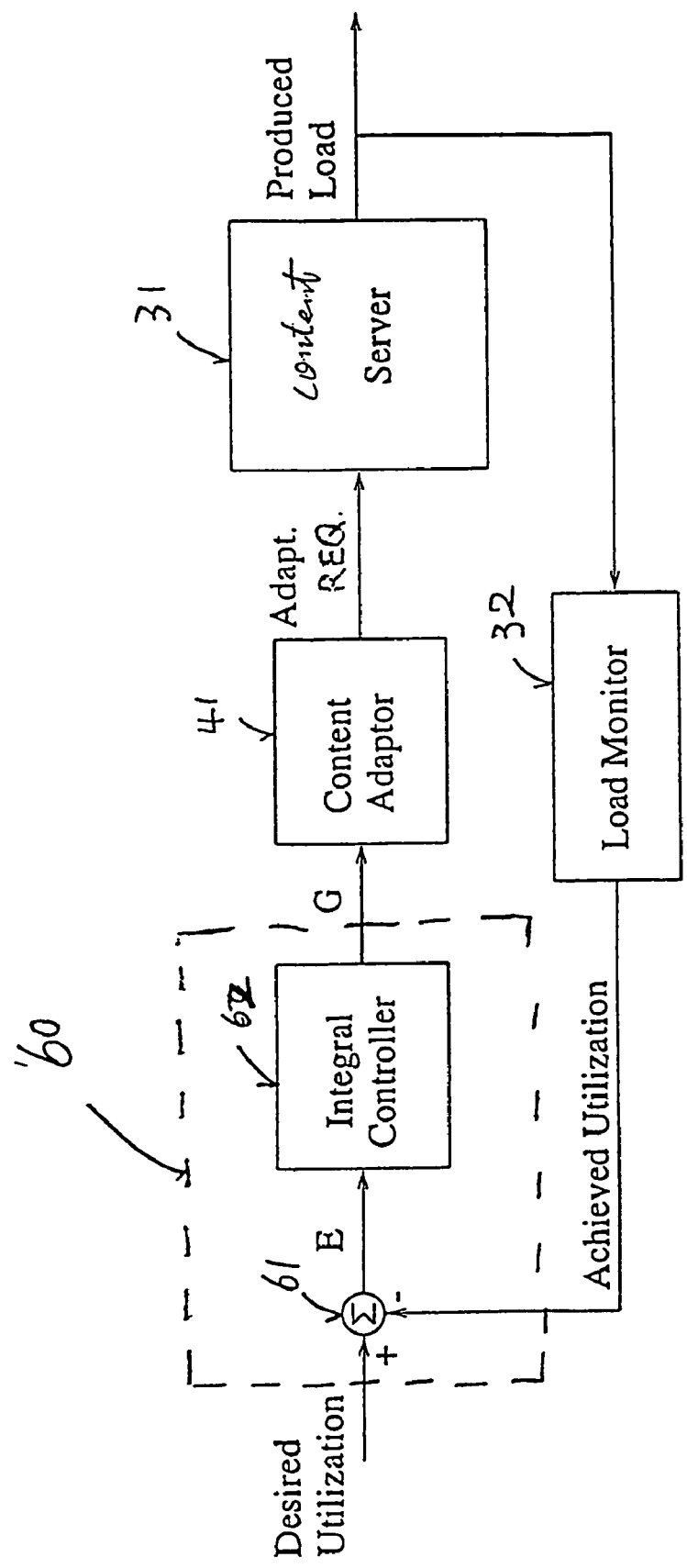
FIG. 3 shows the control and feedback loop of the adaptive data service system of FIG. 2 for partial degradation.

FIG. 3 shows the control and feedback loop of the adaptive load control system 40 of FIG. 2 for self-regulating partial degradation in accordance with another embodiment of the present invention. In this embodiment as shown in FIG. 3, a partial degradation module 60 is used to control the partial degradation. The module 60 includes a integral controller 60 and an adder 61. The achieved server utilization from the load monitor 32 is fed to the adder 61 of the module 60. The desired load utilization is also fed to the adder 61. The end result E (i.e., the difference between the two utilizations) from the adder 61 is then fed to the integral controller 62. The integral controller 62 then adjusts the control parameter G to control the content adapter 41 to adjust the number of access requests for adaption. Using the feedback, the content adapter 41 can quickly and automatically adjust the number of degraded requests to be around the target or desired utilization.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A data service system in a data service network system, comprising:
 a content server that statically stores a plurality of content files for access by external access requests, wherein a first of said plurality of content files comprises content stored in a full content format and wherein a second of said plurality of content files comprises corresponding content stored in an adapted content format which is less resource-intensive to serve than the full content format, wherein the content server comprises a computer; and
 adaptive load control system software coupled to said content server to pass the access requests to said content server, wherein the adaptive load control system software modifies an access request address to access said second of said plurality of content files instead of said first of said plurality of content files by modifying a URL (Universal resource Locator) of the access request address when said content server is in an overload condition such that said content server is maintained at safe load conditions, said adaptive load control system software comprising:
 load monitor software that monitors a load condition of said content server without requiring monitoring of a network, said load monitor software establishing the load condition of said content server by measuring an amount of time between when said content server receives an external access request and when said content server provides a response to the external access request;

software implementing a control and feedback loop configured for self-regulating partial degradation such that a fraction of said external access requests are modified to access said second of said plurality of content files when said content server is in said overload condition; and controller software that determines a difference between the load condition monitored by the load monitor software and a desired load condition and, based on the difference, varies the fraction of said external access requests between all, some, and none of said external access requests, thereby adjusting the load condition of the content server toward the desired load condition.

2. The data service system of claim 1, wherein said adaptive load control system software modifies the access request address to access said first of said plurality of content files to access the content in the full content format instead of in the adapted format when said content server is not in the overload condition.

3. The data service system of claim 1, wherein for each of said plurality of content files, said content server includes a service directory that directs a modified access request to access said first of said plurality of content files or said second of said plurality of content files.

4. In a data service system of a data access network system having a content server that statically stores a plurality of content files for access by external access requests, a method of maintaining the content server at safe load conditions, comprising:

determining a load condition of said content server without requiring determining load conditions of a network when the data service system receives an access request address to access of a first of said plurality of content files statically stored in said content server comprising content stored in a full content format, wherein said determining of said load condition of said content server comprises measuring an amount of time between when said content server receives an external access request and when said content server provides a response to the external access request;

if said content server is determined to be in an overload condition, then modifying the access request address to access a second of said plurality of content files statically stored in said server and comprising corresponding content in an adapted content format instead of in the full content format by modifying a URL (Universal resource Locator) of the access request address, and wherein the adapted content format is less resource-intensive to serve than the content in the full content format such that the content server is maintained at the safe load conditions;

implementing a control and feedback loop providing self-regulating partial degradation such that a fraction of said external access requests are modified to access said second of said plurality of content files when said content server is in said overload condition; and determining a difference between the load condition and a desired load condition and, based on the difference, varying the fraction of said external access requests between all, some, and none of said external access requests, thereby adjusting the load condition of the content server toward the desired load condition.

5. The method of claim 4, further comprising modifying the access request address to access said first of said plurality of content files statically stored in said content server instead of said second of said plurality of content files statically stored in said content server format when said content server is determined not to be in the overload condition.

6. The method of claim 4, wherein determining the load condition of said content server is performed either within said content server or external to said content server.

* * * * *

UNITED STATES PATENT AND TRADEMARK OFFICE
CERTIFICATE OF CORRECTION

PATENT NO. : 8,200,837 B1
APPLICATION NO. : 09/299684
DATED : June 12, 2012
INVENTOR(S) : Nina T. Bhatti et al.

It is certified that error appears in the above-identified patent and that said Letters Patent is hereby corrected as shown below:

In the Claims:

In column 14, line 34, in Claim 5, after "server" delete "format".

Signed and Sealed this
Fourth Day of June, 2013

Teresa Stanek Rea
*Acting Director of the United States Patent and Trademark Office*